United States Patent
Van Leekwijck et al.

(10) Patent No.: US 8,688,855 B2
(45) Date of Patent: Apr. 1, 2014

(54) METHOD AND DEVICES FOR PERFORMING TRAFFIC CONTROL IN TELECOMMUNICATION NETWORKS

(75) Inventors: Josephine Adriaan Werner Van Leekwijck, Antwerp (BE); Koen De Schepper, Mortsel (BE)

(73) Assignee: Alcatel Lucent, Paris (FR)

( * ) Notice: Subject to any disclaimer, the term of this patent is extended or adjusted under 35 U.S.C. 154(b) by 232 days.

(21) Appl. No.: 13/129,907

(22) PCT Filed: Nov. 30, 2009

(86) PCT No.: PCT/EP2009/008660
§ 371 (c)(1),
(2), (4) Date: Jul. 6, 2011

(87) PCT Pub. No.: WO2010/069481
PCT Pub. Date: Jun. 24, 2010

(65) Prior Publication Data
US 2011/0264821 A1  Oct. 27, 2011

(30) Foreign Application Priority Data
Dec. 16, 2008 (EP) .................. 08305952

(51) Int. Cl.
*G06F 15/16* (2006.01)
*G06F 12/00* (2006.01)
(52) U.S. Cl.
USPC ........................................... 709/235
(58) Field of Classification Search
USPC .................... 709/217–219, 223–229, 250
See application file for complete search history.

(56) References Cited

U.S. PATENT DOCUMENTS

| | | | | |
|---|---|---|---|---|
| 7,983,156 | B1* | 7/2011 | Papirakis | 370/229 |
| 2003/0099195 | A1* | 5/2003 | Lee | 370/229 |
| 2003/0165150 | A1* | 9/2003 | Zimmermann et al. | 370/412 |
| 2004/0111541 | A1 | 6/2004 | Meyer et al. | |
| 2004/0218617 | A1* | 11/2004 | Sagfors | 370/412 |
| 2004/0264377 | A1* | 12/2004 | Kilkki et al. | 370/235 |

(Continued)

FOREIGN PATENT DOCUMENTS

EP    1249972 A1    10/2002

OTHER PUBLICATIONS

Aweya, J. et al.: "A Load Adaptive Mechanism for Buffer Management", Computer Networks, Elsevier Science Publishers B.V., Amsterdam, NL, vol. 36, No. 5-6, Aug. 1, 2001 (pp. 709-728).

(Continued)

*Primary Examiner* — Zarni Maung
(74) *Attorney, Agent, or Firm* — Harness, Dickey & Pierce

(57) ABSTRACT

A method is disclosed for performing traffic control in a network, the network comprising at least one link, the method comprising: —measuring the data traffic rate, the data traffic comprising at least one data flow, at at least one link which carries the data traffic; —defining a first and a second threshold value, the second threshold value being larger than the first threshold value; —determining whether the measured data rate is larger than the first threshold value; and if so, starting congestion signaling of a first type, —determining whether the data rate is larger than the second threshold value; and if so, starting congestion signaling of a second type, wherein at least one of the first and the second threshold values are modified over time, based on data traffic information.

14 Claims, 6 Drawing Sheets

(56) References Cited

U.S. PATENT DOCUMENTS

| | | | |
|---|---|---|---|
| 2005/0039103 A1* | 2/2005 | Azenko et al. | 714/776 |
| 2005/0147033 A1* | 7/2005 | Chin et al. | 370/229 |
| 2005/0163056 A1* | 7/2005 | Ranta-Aho et al. | 370/252 |
| 2008/0037552 A1* | 2/2008 | Dos Remedios et al. | 370/395.21 |
| 2008/0075003 A1* | 3/2008 | Lee et al. | 370/230 |
| 2008/0259785 A1* | 10/2008 | Truong et al. | 370/217 |
| 2009/0296582 A1* | 12/2009 | Shi et al. | 370/236 |
| 2010/0054126 A1* | 3/2010 | Kwan et al. | 370/235 |

OTHER PUBLICATIONS

Philip Eardley (Editor), Notification Working Group BT: "Pre-Congestion Notification (PCN) Architecture; draft-ietf-pcn-architecture-08.txt", Internet Engineering Task Force, Geneva, Switzerland, vol. pcn, No. 8, Oct. 28, 2008.

International Search Report.

\* cited by examiner

METHOD AND DEVICES FOR PERFORMING TRAFFIC CONTROL IN TELECOMMUNICATION NETWORKS

TECHNICAL FIELD OF THE INVENTION

The present invention relates to the field of methods for performing data traffic control for a telecommunication network, the network comprising nodes arranged and connected to each other, comprising at least one link.

BACKGROUND OF THE INVENTION

The PCN working group of the Internet Engineering Task Force IETF is investigating pre-congestion notification mechanisms to implement traffic control as for instance admission control and flow termination procedures (see for instance the IETF draft draft-ietf-pcn-architecture-08). The packet marking layer of the architecture includes a mechanism by which PCN interior nodes monitor traffic rates on their links and mark packets depending on the type of pre-congestion. An admissible rate (AR) and a supportable rate (SR) need to be defined for each link (L).

The AR-pre-congestion mechanism results in the admission control function not allowing new flows, while the SR-pre-congestion mechanism can result additionally in the termination function to terminate some previously admitted flows (see for instance FIG. 1).

The filling level of the network, which supports a maximum number of flows, without degrading their QOS, obviously depends on the setting of the specific values of AR and SR for the different links.

The values of AR and SR have to be configured for all PCN interior nodes, and are crucial for the overall operation of the network. The exact values of AR and SR have to be defined by the network operator and can possibly be different for different links within the network.

There exist a need for improved traffic management methods and associated devices.

SUMMARY OF THE INVENTION

When terms as "first", "second", "third" and the like are used, this does not necessarily mean that a sequential or that a chronological order is to be assumed.

The term "comprising", should be interpreted as such that it does not exclude other elements or steps.

For the purpose of the present invention, the following terminology has been used, corresponding to the terminology used in the IETF draft www.ietf.org/internet-drafts/draft-ietf-pcn-architecture-08.txt; unless indicated otherwise:

PCN-domain: a PCN-capable domain; a contiguous set of PCN-enabled nodes that can perform DiffServ scheduling [RFC2474]; the complete set of PCN-nodes whose PCN-marking can in principle influence decisions about flow admission and termination for the PCN-domain, including the PCN-egress-nodes, which measure these PCN-marks.

PCN-boundary-node: a PCN-node that connects one PCN-domain to a node either in another PCN-domain or in a non PCN-domain.

PCN-interior-node: a node in a PCN-domain that is not a PCN-boundary-node.

PCN-node: a PCN-boundary-node or a PCN-interior-node

PCN-egress-node: a PCN-boundary-node in its role in handling traffic as it leaves a PCN-domain.

PCN-ingress-node: a PCN-boundary-node in its role in handling traffic as it enters a PCN-domain.

PCN-flow: the unit of PCN-traffic that the PCN-boundary-node admits (or terminates); the unit could be a single microflow (as defined in [RFC2474]) or some identifiable collection of microflows.

Ingress-egress-aggregate: The collection of PCN-packets from all PCN-flows that travel in one direction between a specific pair of PCN-boundary-nodes.

Threshold-marking: a PCN-marking behavior with the objective that all PCN-traffic is marked if the PCN-traffic exceeds the PCN-threshold-rate.

Excess-traffic-marking: a PCN-marking behavior with the objective that the amount of PCN-traffic that is PCN-marked is equal to the amount that exceeds the PCN-excess-rate.

Pre-congestion: a condition of a link within a PCN-domain such that the PCN-node performs PCN-marking, in order to provide an "early warning" of potential congestion before there is any significant build-up of PCN-packets in the real queue.

PCN-marking: the process of setting the header in a PCN-packet based on defined rules, in reaction to pre-congestion; either threshold-marking or excess-traffic-marking.

PCN-feedback-information: information signaled by a PCN-egress-node to a PCN-ingress-node (or a central control node), which is needed for the flow admission and flow termination mechanisms.

PCN-admissible-rate (AR): the rate of PCN-traffic on a link up to which PCN admission control should accept new PCN-flows.

PCN-supportable-rate (SR): the rate of PCN-traffic on a link down to which PCN flow termination should, if necessary, terminate already admitted PCN-flows.

The state of the art, on which the preamble of claim 1 is based, discloses a method for performing traffic control in a network, the network comprising at least one link, comprising a. measuring the data traffic rate, said data traffic comprising at least one data flow, at at least one link, which carries the data traffic;

b. defining a first and a second threshold value, said second threshold value being larger than said first threshold value;

c. determining whether the measured data rate is larger than a first threshold value; and if so, start congestion signaling of a first type;

d. determining whether the data rate is larger than a second threshold value; and if so, start congestion signaling of a second type.

If these values are chosen wrongly, different problems may arise, as for instance:

if the AR value is set too high, flows may be admitted, which may later on cause the SR value to be crossed (for instance due to the variable bit rate nature of the flows, or change of characteristics of the flow, . . . ), and this may lead to termination of certain flows, which is to be avoided as much as possible as it reduce the service comfort of the users. Flow termination should normally only be performed in exceptional circumstances such as for instance network link or node failures, and a lack of resources on the back-up path;

if AR value is set too low, the admission control function will sooner refuse new flows, reducing the number of active flows, and thus the number of served users);

if SR value is set too high, there is a risk that the link will undergo real congestion, and packets will be dropped. This leads to a degradation of the quality (for instance Quality of Service (QoS)) of impacted flows (which may be many or potentially even all flows, as the PCN interior nodes are not expected to be aware of individual flows); setting the SR value too low may cause the termination function to take action too soon, terminating some flows, while there may have been really no need to do so.

It is an object of the present invention to provide a method, which solves at least one of the above problems.

This is achieved by the characterizing features of claim 1.

According to a first aspect of the present invention a method for performing traffic control in a network is disclosed, the network comprising at least one link, the method comprising a) measuring the data traffic rate, the data traffic comprising at least one data flow, at at least one link which carries the data traffic;
b) defining a first and a second threshold value, the second threshold value being larger than the first threshold value;
c) determining whether the measured data rate is larger than the first threshold value; and if so, starting congestion signaling of a first type,
d) determining whether the data rate is larger than the second threshold value; and if so, starting congestion signaling of a second type, wherein at least one of the first and the second threshold values are modified over time, based on data traffic information.

The signaling can be performed according to a PCN scenario, for instance by marking at least some (or all) data packets of the data traffic which pass through the link, possibly at a, for instance interior, node of the network which is directly connected to this link.

Signaling of a first and second type can correspond to congestion marking of a first and second type respectively.

The method may further comprise one or more of the following:
receiving the marked data packets (of the first type and/or the second type) at the border notes of the network;
analyzing the marked packets, in order to analyze the congestion status of the network;
communicate (information relating to) the result of the analysis to the border notes of the network;
making data traffic decisions impacting the PCN flows, at the ingress border notes.

The "data traffic rate" can also be called "data rate of data traffic". Data traffic information comprises or consists of information about the data traffic.

It can be noted that the method can be applied in the context of different types of networks, such as for instance networks of the meshed network or tree network type. The network can comprise at least 2 border nodes and at least one interior node. Moreover, the signaling and corresponding architectures do not necessarily have to correspond to PCN specific signaling and architecture. The PCN domain is thus not the only domain in which methods according to embodiments of the present invention can be applied; it may be applied generally to other measurement based control systems. For the purpose of the present description, PCN has been used as an example of a system, the working of which can be improved with the adaptive threshold method according to embodiments of the present invention.

The first and second threshold values can be time dependent. They can for instance be based on data traffic measurement and statistical analyses thereof in order to define predetermined patent for the evolution of the first and/or second threshold value in time (for instance day time/night time, working day/weekend, . . . ).

In typical embodiments the congestion marking of the second type replaces the congestion marking of the first type as this latter marking would be implicit in the case of the congestion marking of the second type.

According to preferred embodiments of the present invention both the first threshold value and the second threshold value can be modified/amended (at least re-determined) over time.

According to preferred embodiments the second threshold value is not larger than a predetermined second threshold limit value (or congestion rate (CR)). The congestion rate can be for instance the real limit rate of the link, or for instance 99.99, 99.9, 99, 98, 97, 96, 95, 90, 85, 80, 75, 70, 65, 60, 55, 50, 45, 40, 35, 30, 25% of the real limit rate of the link.

According to preferred embodiments the modification of threshold values is further based on a set of constraint rules. An example of such a constraint rule may be that the allowable rate should always be larger than 25% of the congestion rate. Another example of the constraint rule may be the fixing of the timing of the calculation of the adapted threshold values at predetermined periods of time, for instance at regular time intervals or for instance at the occurrence of predetermined events. Another example of a constraint rule may be the allowance/denial of traffic for a specific IP address, or for specific types of flows (for instance emergency calls, business user flows).

According to preferred embodiments the data traffic information comprises information relating to the evolution of data traffic rate in time (for a link).

According to preferred embodiments the data traffic information comprises information relating to the minimum and/or maximum data traffic rate within a predetermined time interval.

According to preferred embodiments the data traffic information comprises information relating to the variability of the data traffic rate within a predetermined time interval.

According to preferred embodiments the predetermined time interval can start when the congestion marking (of the first type, or of the second type) is initiated.

According to preferred embodiments the predetermined time interval starts when a predetermined threshold value is exceeded, for instance when the first or the second threshold value is exceeded.

The predetermined time interval can end when the congestion marking ends (of the first type, or of the second type). The congestion marking may end as soon as the data traffic rate becomes smaller than the respective first or second threshold value.

According to preferred embodiments a further "hysteresis" may be introduced by only ending the congestion marking when the data traffic rate goes below a value which is lower than the respective first and second threshold value, for instance below a value of 99, 95, 90, 85, 80, 75, 70% of the respective threshold value.

According to preferred embodiments of the present invention the first threshold can be increased if the maximum data traffic rate remains lower than a predetermined first threshold limit value, within a predetermined time interval. The predetermined first threshold limit value can be the second threshold value.

According to preferred embodiments of the present invention the first threshold is decreased if the data traffic rate is larger than the predetermined first threshold limit value, within a predetermined time interval. The predetermined first threshold limit value can be the second threshold value.

According to preferred embodiments, a method is disclosed wherein the second threshold value is increased if the maximum data traffic rate is smaller than a predetermined second threshold limit value, within a predetermined time interval. The predetermined second threshold limit value can be the congestion rate, which can be for instance the real limit rate of the link.

According to further embodiments of the present invention the second threshold value is decreased if the maximum data traffic rate is larger than the predetermined second threshold limit value, within a predetermined time interval.

According to embodiments of the present invention the predetermined time interval can also be time dependent (i.e. it can become shorter or longer when time passes), depending on the behavior of the system. For instance when the system tends towards oscillating a lot (decreasing and increasing the levels), the time interval can be made larger or increased, resulting in a longer period before deciding to decrease/increase the respective threshold level.

According to preferred embodiments of the present invention the modification/adaptation/evaluation for the first and/or second threshold values over time follows or occurs according to a predetermined pattern. This predetermined pattern may for instance be based on historic data and for instance statistical analysis thereof. According to such embodiments the predetermined pattern can preferably be predetermined at an analysis centre, which is preferably located outside the network nodes.

According to embodiments of the present invention the modification/adaptation/evaluation of the first and/or second threshold values over time can be controlled in a network node (for instance an interior node) of the network itself, which is directly connected with the respective link. These embodiments are preferably associated with scenarios wherein the network node is capable of analyzing its own measurements.

According to preferred embodiments the modification over time is controlled by a management unit, which is located at a location different from a (interior) node which is directly connected to the link. The management unit can be collocated with the analysis centre.

According to preferred embodiments, the methods according to embodiments of the present invention can be applied to a PCN enabled network, and the first threshold value can correspond to the "Admissible Rate" and the second threshold value can correspond to the "Supportable Rate".

According to a second aspect of the present invention, a network element which is adapted for functioning as a (for instance an interior) node of a network, the network element comprising
a) Means for communicating with a management system, to hereby receive initial (first and second) data traffic rate threshold values and optionally a set of constraint rules;
b) Means for measuring the data traffic rate at at least one link;
c) Means for analyzing the measured traffic rate in view of the (first and second) threshold values and optionally the set of constraint rules;
d) Means for modifying the first and second threshold values based on the analysis.

Further aspects of the present invention are described by the dependent claims. The features from the dependent claims, features of any of the independent claims and any features of other dependent claims may be combined as considered appropriate to the person of ordinary skill, and not only in the particular combinations as defined by the claims.

BRIEF DESCRIPTION OF THE DRAWINGS

The accompanying drawings are used to illustrate embodiments of the present invention.

Reference signs are chosen such that they are the same for similar or equal elements or features in different figures or drawings.

DESCRIPTION OF ILLUSTRATIVE EMBODIMENTS

The above and other advantageous features and objects of the invention will become more apparent and the invention will be better understood from the following detailed description when read in conjunction with the respective drawings.

The description of aspects of the present invention is performed by means of particular embodiments and with reference to certain drawings but the invention is not limited thereto. Depicted figures are only schematic and should not be considered as limiting.

In the description of certain embodiments according to the present invention, various features are sometimes grouped together in a single embodiment, figure, or description thereof for the purpose of aiding in the understanding of one or more of the various inventive aspects. This is not to be interpreted as if all features of the group are necessarily present to solve a particular problem. Inventive aspects may lie in less than all features of such a group of features present in the description of a particular embodiment.

While some embodiments described herein include some but not other features included in other embodiments, combinations of features of different embodiments are meant to be within the scope of the invention, and form different embodiments, as would be understood by the skilled person.

Embodiments of the present invention comprise measuring of bandwidth over a specific time window (or period or time interval), and taking data traffic decisions based on comparing the measured value(s) with some thresholds. The output of this decision can be used to control the traffic (for instance admission and termination). The thresholds can be adapted/learned, possibly based on the variability of the traffic, and/or based on the rate of new requests of service users.

Figure 1:
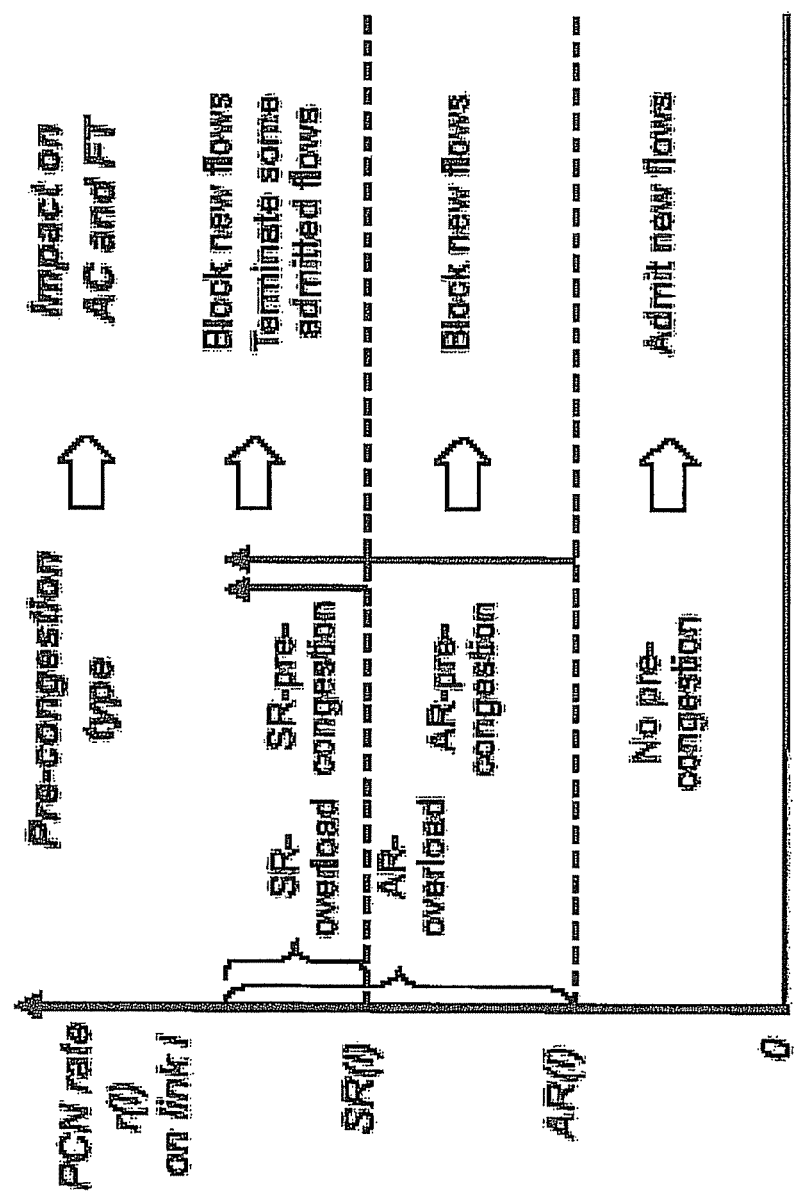
FIG. 1 illustrates the functioning of the congestion control according to state of the art technology.
Figure 2:
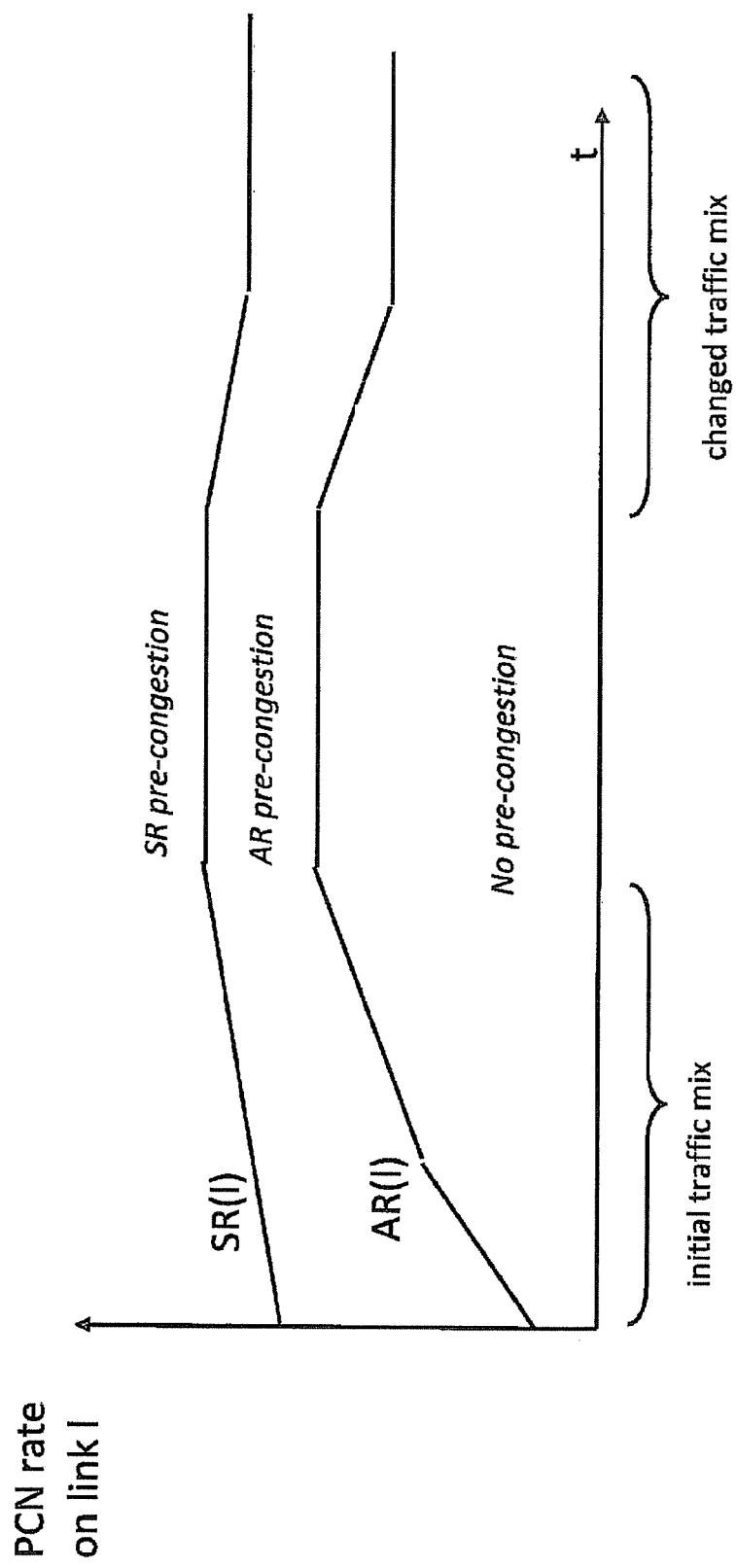
FIG. 2 illustrates the functioning of the traffic control mechanism according to embodiments of the present invention.
Figure 3:
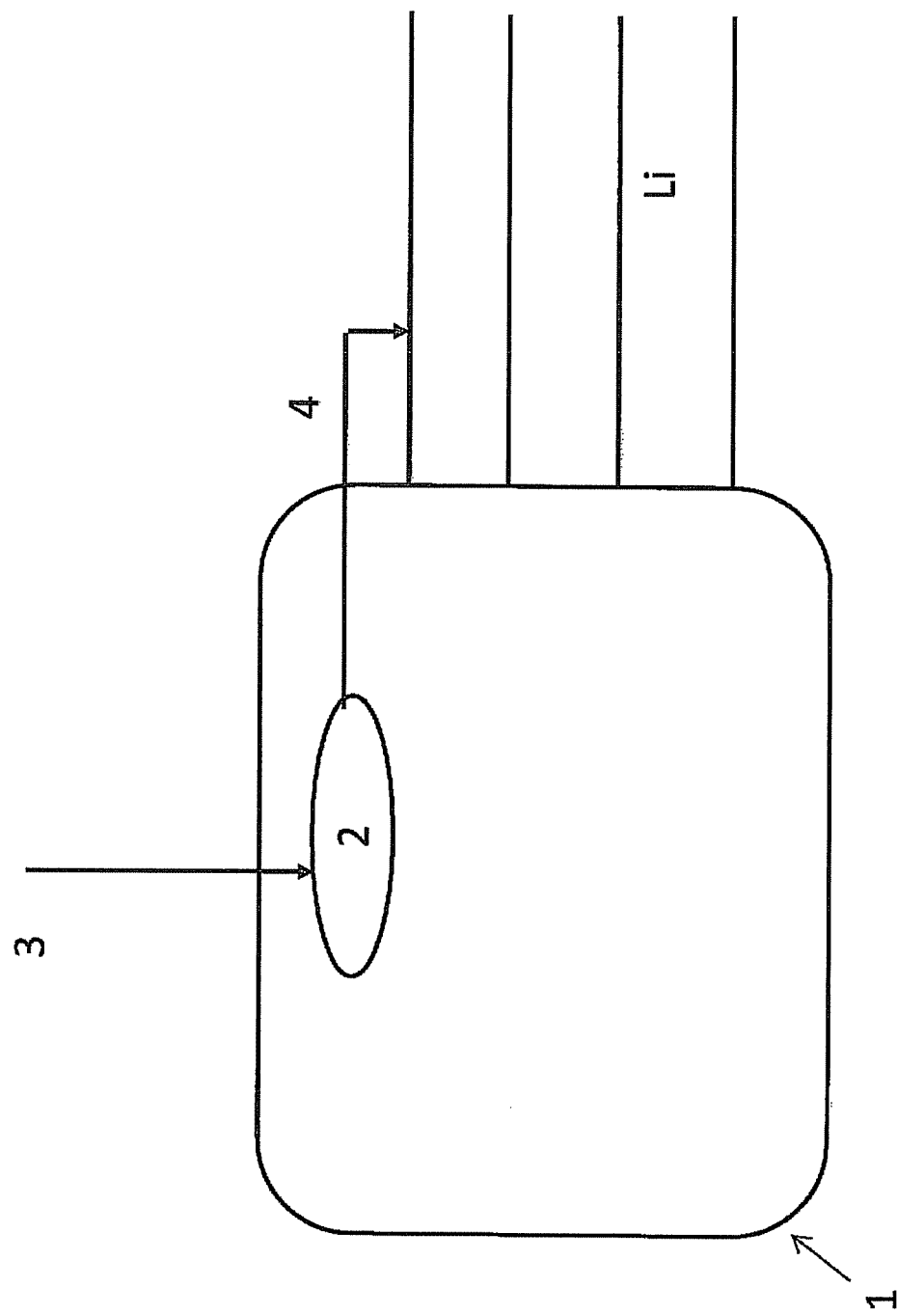
FIG. 3 illustrates the functionalities of network elements or nodes which are adapted for functioning according to methods according to embodiments of the present invention.

In embodiments of the present invention a mechanism has been defined in which PCN nodes themselves set and tune the precise values of Admissible rate (AR) and Supportable Rate (SR) in order to achieve optimal operation of the PCN network, preferably within certain boundaries or constraints specified by the network operator (see FIG. 3; a PCN element (or network node) (1) can comprise a PCN adaptation function or means (2), which is adapted for receiving initial AR and SR values and constraint rules (3), and which is further adapted to measure and, if necessary, adjust SR and AR levels (4) for a link (Li) directly connected to the PCN element (or network node)). It allows the PCN mechanism to be used in a variety of circumstances and data traffic mix scenarios, and allows the nodes to set their AR and SR values automatically, in an optimized way (see FIG. 2).

For instance, when the traffic has a predominantly constant bit rate, the AR and SR values can both be set to relatively higher values, with low risk of real congestion.

When the traffic is though highly variable in bit rate, more conservative (i.e. relatively lower) AR and SR settings may be recommendable. In time, the constitution (e.g. flows) of the mix of data traffic on the network may vary, and the AR and SR settings may need to be adjusted accordingly.

According to embodiments of the present invention, PCN-capable network elements with adaptable or modifiable PCN levels can comprise a PCN-adaptation function which can (preferable per link, preferable for each link):
 receive information from a management system. This can be for instance initial SR and AR values, and optionally constraints which can drive the adaptation/modification process;
 measure the traffic levels and assess the situation in function of the constraints and initial SR and AR values;
 adapt/modify the SR and/or AR values according to the traffic characteristics and within the constraints imposed by the network operator.

According to a first example, for tuning the SR value, the following algorithm could be used:
 Define the congestion rate (CR) as the level that never should be exceeded. Initially one could start with a (default) SR rate SR-0 (specified as absolute value or for instance a percentage of the link capacity);
 Whenever the PCN line rate exceeds the SR, perform normal SR marking (according to the IETF draft draft-ietf-pcn-architecture-08), but in addition monitor if the CR value is being reached;
 If CR is not reached during the SR-pre-congestion period, and for a predetermined amount of time, increase the SR value (for instance with a fixed amount increase step, or with a percentage of the previous value, . . . );
 If the CR value was reached, decrease the SR value (e.g. by a fixed amount decrease step, or with a percentage of the previous value . . . ).

It can be noted that further mechanisms can be foreseen which are adapted to take care of situations where CR is exceeded due to exceptional circumstances such as network link or node failures. In this case, there would be no real need to adjust the SR, and it would thus be inappropriate to do so, as it relates to a transient phenomenon.

According to a second example, for tuning the AR value:
 Initially start with a (default) AR rate AR-0.
 Whenever the rate exceeds the AR, perform normal AR marking (according to the IETF draft draft-ietf-pcn-architecture-08), but in addition monitor if the AR-limit (which could reasonably be the SR level, but which can be any value below the SR value) is reached.
 If AR-limit was not reached during the AR-pre-congestion period, and for a predetermined amount of time, increase the AR value (e.g. with a fixed amount increase step, or with a percentage of the previous value, . . . ).
 If the AR-limit was reached, decrease the AR value (e.g. by a fixed amount decrease step, or with a percentage of the previous value, . . . ).

Figure 4:
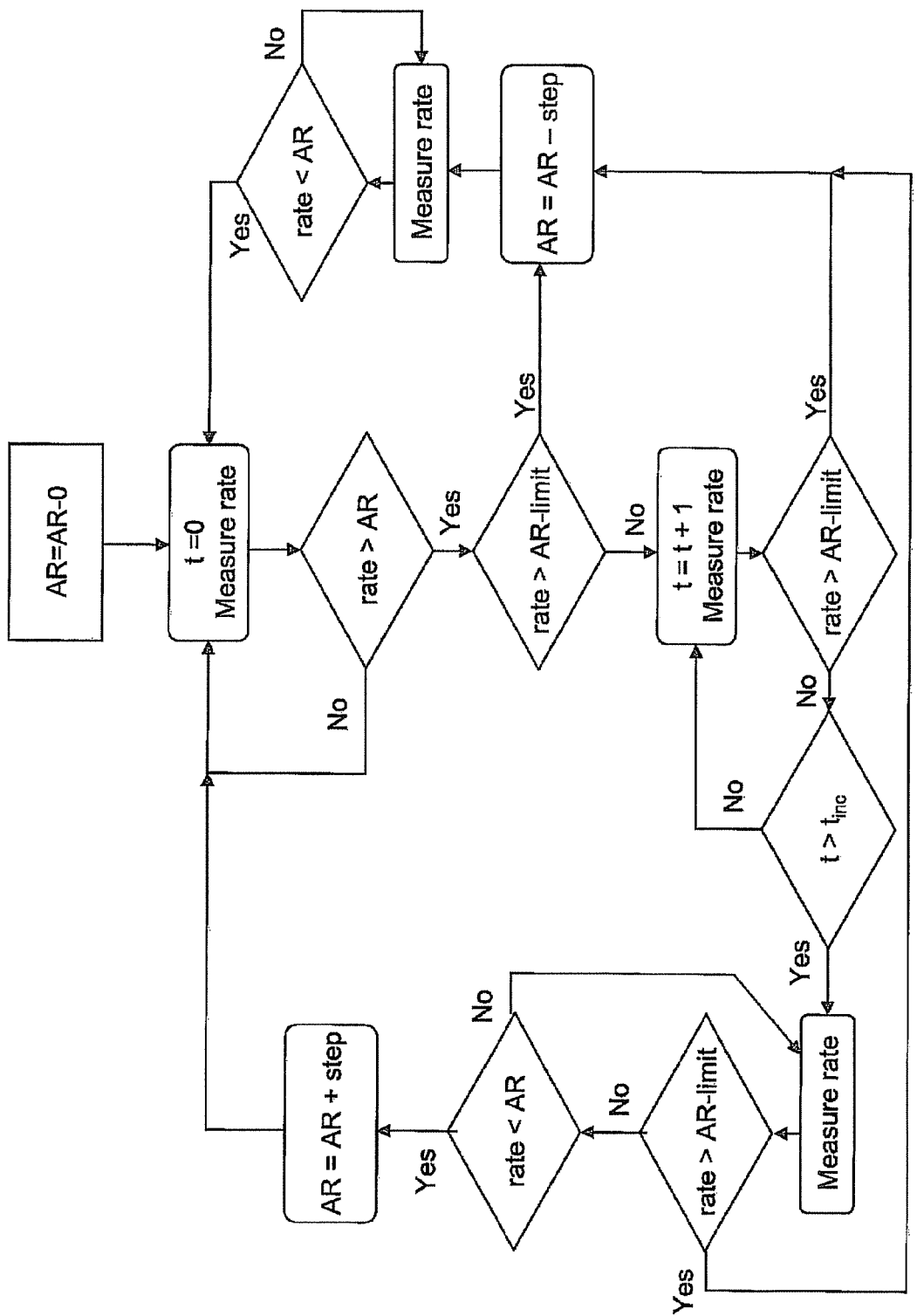
FIG. 4 shows a flow-chart illustrating embodiments of the present invention.

In FIG. 4 a flowchart is provided which illustrates a possible algorithm or process that can be used according to embodiments of the present invention, in which the AR value can be adapted by adding or subtracting a fixed step value. The predetermined time interval is here represented by "t_inc".

Figure 5:
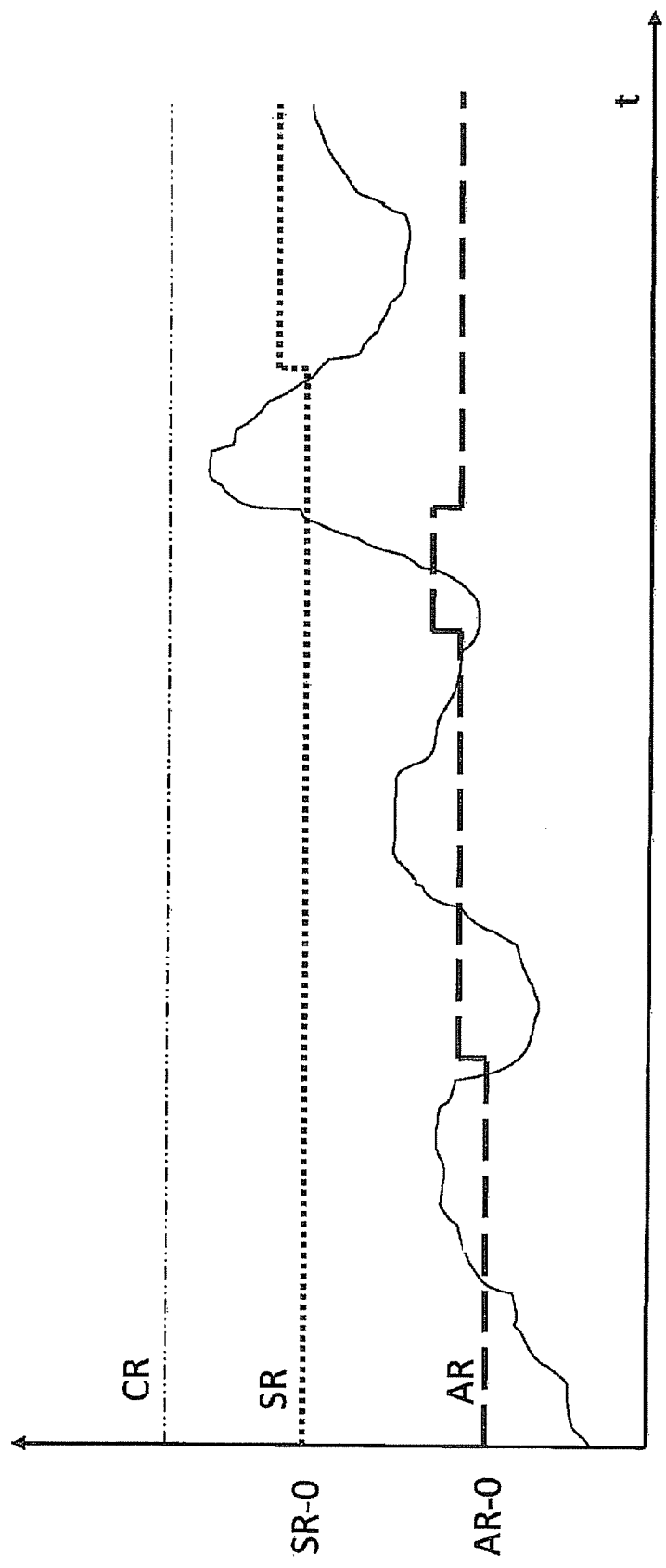
FIG. 5 illustrates a possible scenario for the evolution of the AR and SR threshold values in time as a function of the measured data traffic rate, wherein the AR value varies according to a fixed step.

FIG. 5 illustrates the evolution of the first and second threshold values (AR and SR respectively) in time as a function of the measured data traffic rate, wherein the AR and SR values are adapted (if appropriate) according to a fixed step. The predetermined first threshold limit value has been chosen to correspond to the SR value, but this is not necessary.

It can be noted that also the fixed step(s) (these steps can be different or the same for the first and second threshold) can also be replaced by time dependent variable step(s) as a function of for instance the measured data traffic rate and/or the current value of the first and/or second threshold value.

Figure 6:
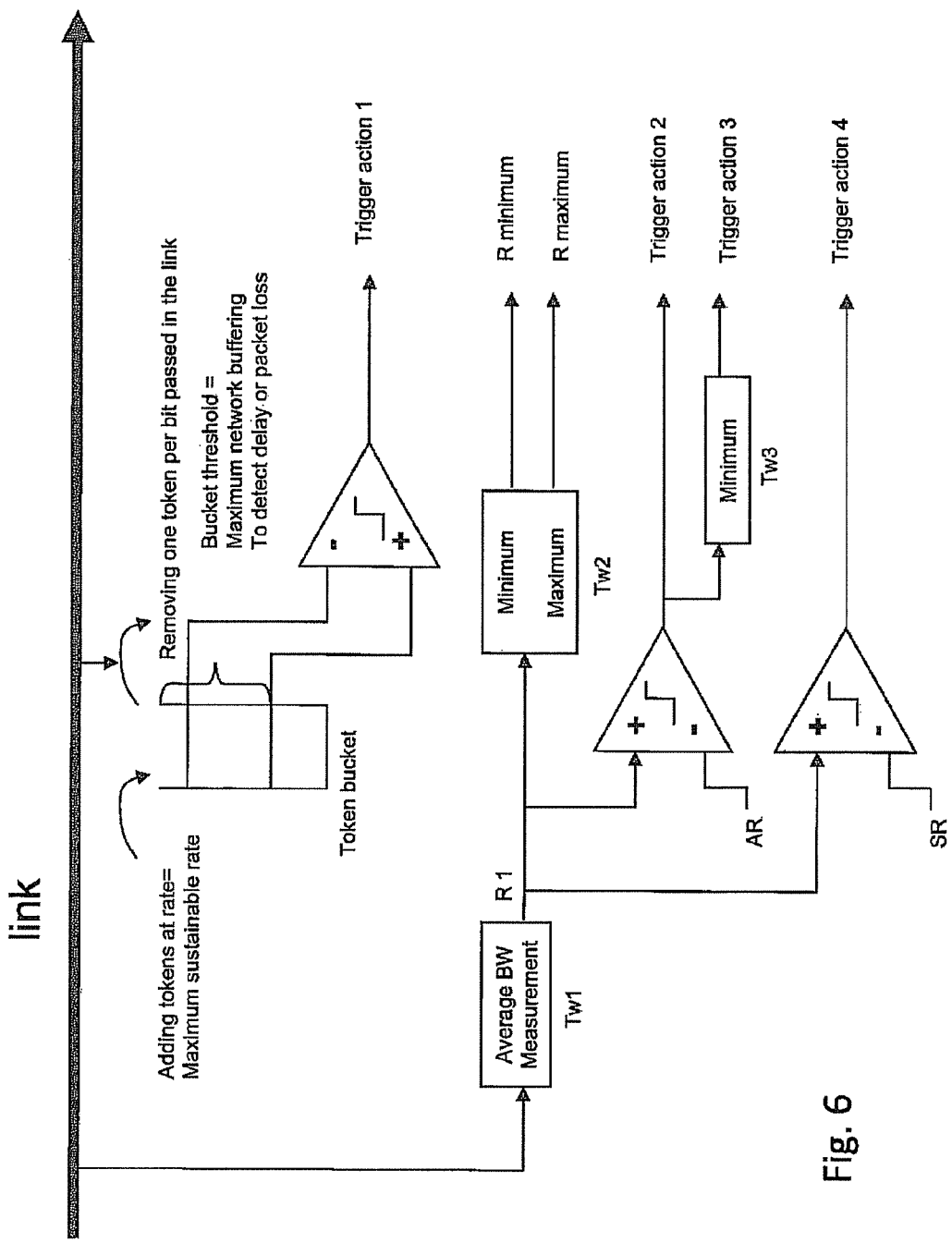
FIG. 6 depicts a flow-chart illustrating a further embodiment of the present invention.

According to a third example, illustrated in FIG. 6, the CR value can be defined by a detection means that guarantees protection of network buffers, network bandwidth and/or a delay less than a maximum delay for a packet buffered in a network. The AR and SR values can be compared with a measured rate R1, wherein the rate R1 can for instance be determined by taking the average of the occupied bandwidth over a sliding window with a first window time interval Tw1 (optionally a weighted average with an exponentially decreasing weight). The minimum and maximum values of the rate R1 over a second sliding window time interval Tw2, wherein Tw2 is preferably larger than Tw1, can be defined as Rminimum and Rmaximum. Action 1 can be triggered when the token bucket depth goes below the bucket threshold, action 2 can be triggered when R1 goes above AR, action 3 can be triggered if R1 is not going below AR for a third sliding window time interval Tw3, and action 4 is triggered if R1 goes above SR.

Action 1 can comprise reducing both AR and SR. This can be for instance reducing SR proportionally to the size of the bucket under-run and assigning AR=(SR*Rminimum/Rmaximum).

Action 2 comprises blocking new flow arrivals.

Action 3 can be dependent on the condition:

AR/SR>Rminimum/Rmaximum

If the result is true, then SR=(AR*Rmaximum/Rminimum).

If the result is false, then AR=(SR*Rminimum/Rmaximum).

Action 4 can comprise in termination of existing flows.

While the principles of the invention have been set out above in connection with specific embodiments, it is to be clearly understood that this description is merely made by way of example and not as a limitation of the scope of protection which is determined by the appended claims.

The invention claimed is:

1. A method for performing traffic control in a network, the network comprising at least one link, the method comprising
 a) measuring the data traffic rate, said data traffic comprising at least one data flow, at at least one link which carries said data traffic;
 b) defining a first and a second threshold value, said second threshold value being larger than said first threshold value;
 c) determining whether the measured data rate is larger than said first threshold value; and if so, starting congestion signaling of a first type;
 d) determining whether the data rate is larger than said second threshold value; and if so, starting congestion signaling of a second type, wherein at least one of said first and said second threshold values are modified independently of each other over time, based on data traffic information.

2. Method according to claim 1, wherein both the first threshold value and the second threshold value are modified over time.

3. Method according to claim 1, wherein the modification of the threshold values is further based on a set of constraint rules.

4. Method according to claim 1, wherein said data traffic information comprises information relating to the evolution of data traffic rate in time.

5. A method according to claim 4, wherein said data traffic information comprises information relating to the minimum and/or maximum data traffic rate within a predetermined time interval.

6. Method according to claim 5, wherein said predetermined time interval starts when said predetermined first threshold value is exceeded.

7. Method according to claim 5, wherein the first threshold is increased if the maximum data traffic rate remains lower than a predetermined first threshold limit value.

8. Method according to claim 5, wherein the first threshold is decreased if the data traffic rate is larger than said predetermined first threshold limit value.

9. Method according to claim 5, wherein the second threshold is increased if the maximum data traffic rate is smaller than a predetermined second threshold limit value.

10. Method according to claim 5, wherein the second threshold value is decreased if the maximum data traffic rate is larger than said predetermined second threshold limit value.

11. Method according to claim 1, wherein the modification of the first and/or second threshold values over time follows a predetermined pattern.

12. Method according to claim 1, wherein the modification over time is controlled in a node directly connected to said link.

13. Method according to claim 1, wherein the modification over time is controlled by a management unit which is located at a location different from a node directly connected to said link.

14. A method according to claim 1, wherein said first threshold value is the Admissible Rate, and the second threshold value is the Supportable Rate.

\* \* \* \* \*